May 10, 1966  B. BINGER  3,250,151
STEERING GEAR FOR TRACKED VEHICLES
Filed Nov. 29, 1963  3 Sheets-Sheet 1

May 10, 1966 — B. BINGER — 3,250,151
STEERING GEAR FOR TRACKED VEHICLES
Filed Nov. 29, 1963 — 3 Sheets-Sheet 2

BY Albert M. Zalkind
ATTORNEY

United States Patent Office 3,250,151
Patented May 10, 1966

3,250,151
STEERING GEAR FOR TRACKED VEHICLES
Bernhard Binger, Ravensburg, Germany, assignor to Zahnradfabrik Friedrichshafen Aktiengesellschaft, Friedrichshafen, Germany
Filed Nov. 29, 1963, Ser. No. 326,936
6 Claims. (Cl. 74—720.5)

The invention is concerned with steering gear of tracked vehicles, of a type wherein small turning radii can be effected mechanically by way of a superimposed gear drive acting on the individual track drive gearing and wherein larger turning radii are effected by means of a superimposed hydrostatic gear.

It is known to equip tracked vehicles for the purpose of steering with a superimposed steering drive as purely mechanical gearing. It is also known to use a hydrostatic drive for such purpose. Attention is called to the U.S. application of Von Thuengen, Ser. No. 263,090, filed March 4, 1963, owned by the present assignee. The mechanical power gear has only as many turning radii as there are speeds in the vehicle transmission; the hydrostatic drive is more versatile and can effect a continuously variable steering arc, but having larger turning radii.

The objects of the invention are to combine in a simple mechanism mechanical and hydrostatic steering in one device, this being to advantage for cross-country and road driving, which require smaller and larger turning radii, respectively. This combination offers the advantage of a rigid steering connection of the driving and of the driven elements for cross-country travel where the steering radii are small, and the flexibility of hydrostatic power steering for road travel, where turning radii are relatively large and maximum steering effort not required, thus reducing the steering range but also the size of the apparatus.

Attention is called to the drawing, in which.

Figure 2:
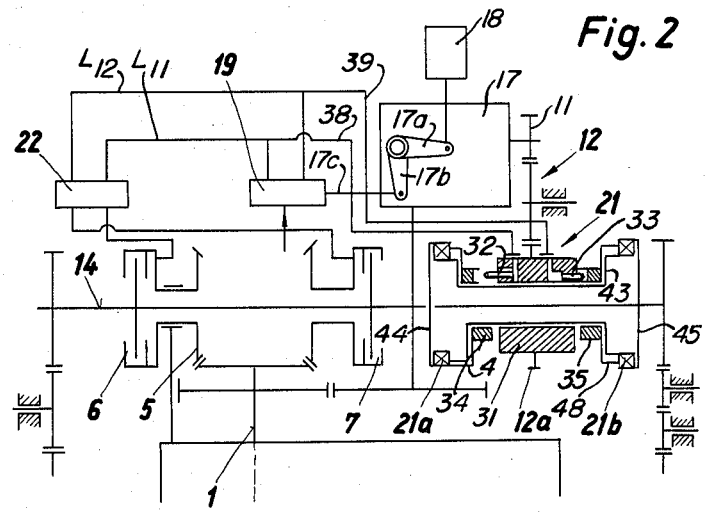
Figure 2A:
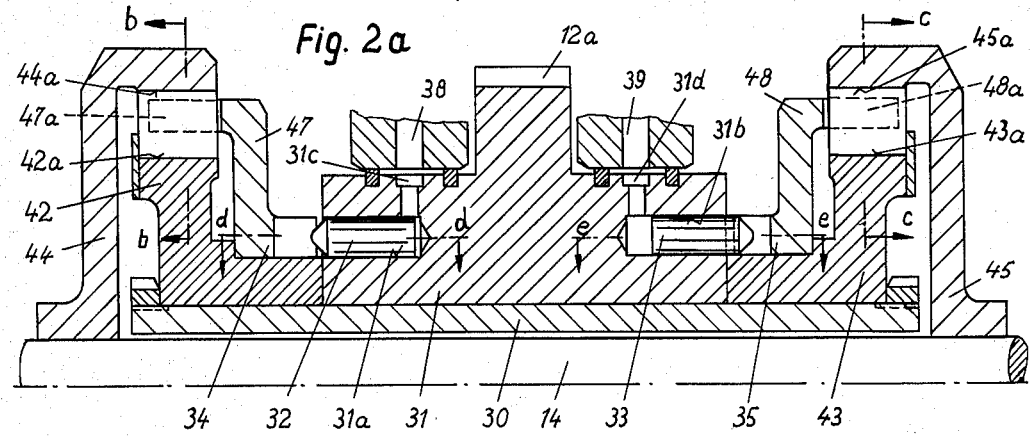
Figure 2B:
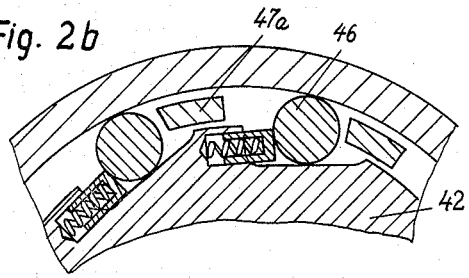
Figure 2C:
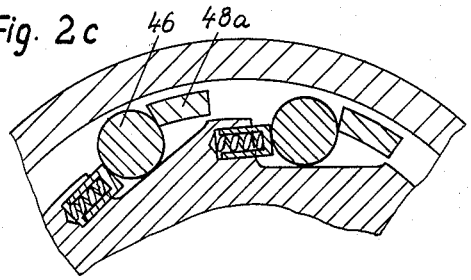
Figure 2F:
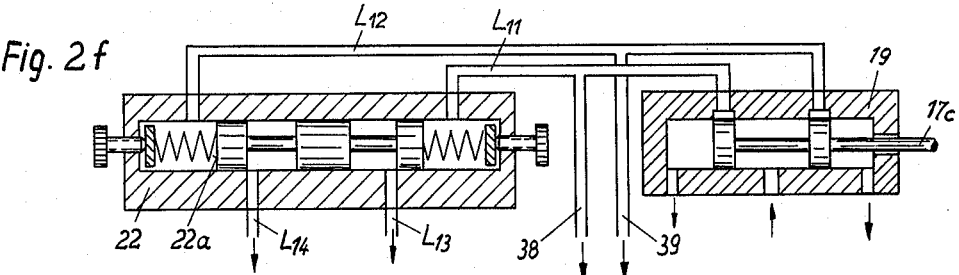
Figures 2D, 2E:
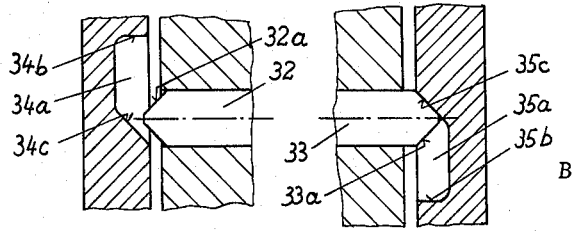
Figure 3:
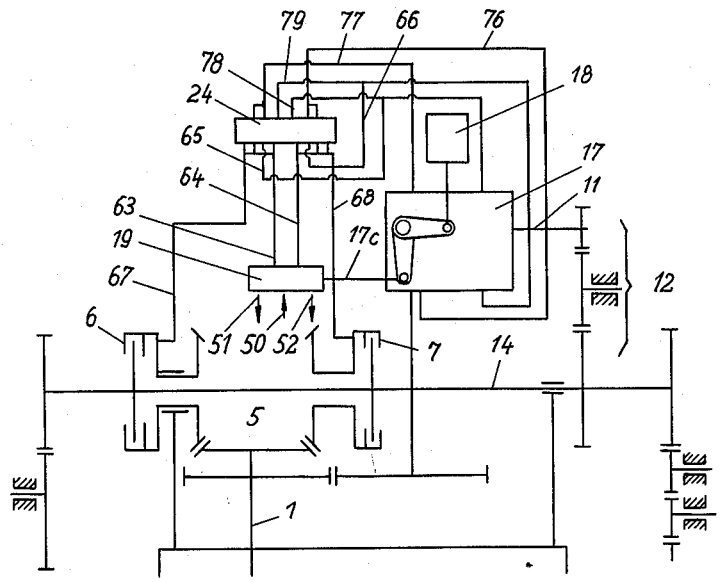

FIG. 2 likewise shows a diagrammatic layout for combined steering drive, where the hydrostatic steering power can be applied to the steering shaft via double one-way clutches;

FIG. 2a shows a fragmentary section of shiftable one-way clutches usable in the system of FIG. 2;

FIG. 2b is a cross section of the first of two shiftable one-way clutches usable in the system of FIG. 2, the view being taken along the line b—b of FIG. 2;

FIG. 2c is a cross section of the second of two shiftable one-way clutches usable in the system of FIG. 2 the view being taken along the line c—c of FIG. 2;

FIG. 2d shows a fragmentary section of shifting means for the first one-way clutch usable in the system of FIG. 2, the view being taken along the line d—d of FIG. 2;

FIG. 2e shows a fragmentary section of shifting means for the second one-way clutch usable in the system of FIG. 2, the view being taken along the line e—e of FIG. 2;

FIG. 2f shows a cross section of the valves 19 and 22;

FIG. 3 shows a further diagrammatic layout for combined steering drive where hydrostatic steering power is directly coupled to the steering shaft, wherein during use of mechanical steering power, the oil circulation of the hydrostatic component is by-passed.

In all modifications the drive of the vehicle is effected by a drive shaft 1 (see FIG. 1) via a gear shift transmission 2, driving two planetary gear systems 3 and 4 for respective tracks of the vehicle. However, shaft 1 is directly connected from the engine or through the transmission to drive a bevel gear 5 which powers the drive discs of the two clutches 6 and 7 in opposite directions for mechanical power steering in turning small radii. The arrangement described above is a conventional superimposed mechanical steering system wherein reversible rotation of a steering shaft 14 is utilized via two spur gear drives 15 and 16, acting on the sun gears of the planet systems, as shown, can effect differential speeds of the planet carriers which drive the tracks. Spur-gear drive 15 is made up of two, and the spur gear drive 16 is made up of three gears, so that the sun gears are reversely rotated thereby.

Accordingly, reverse rotation is imparted to the sun gears to effect track speed differential, and steering direction is determined by the direction of rotation of shaft 14, dependent upon selective engagement of clutch 6 or 7 driven in opposite directions by bevel gear 5, the clutch outputs being directly connected to shaft 14.

The diameter of the turning circle can be changed by means of the gear shift. Thus, in first gear, the smallest arc of turn is effected and the largest arc is in fourth gear. This is due to the ratio change provided by the speed of shaft 14 driven via the engine, and the variable speeds of the planet system carriers controlled by the transmission. The relative rotative rates under superimposed steering power vary accordingly, in a well known manner.

Below the bevel gear 5, a gear 8 is keyed on drive shaft 1, which meshes with a gear 9 keyed on a shaft 10 for driving the hydrostatic pump-motor combination 17 which is controlled in speed and direction by means of the lever 17a from no speed to full speed, via operator control means 18 which rocks lever 17a.

Figure 1:
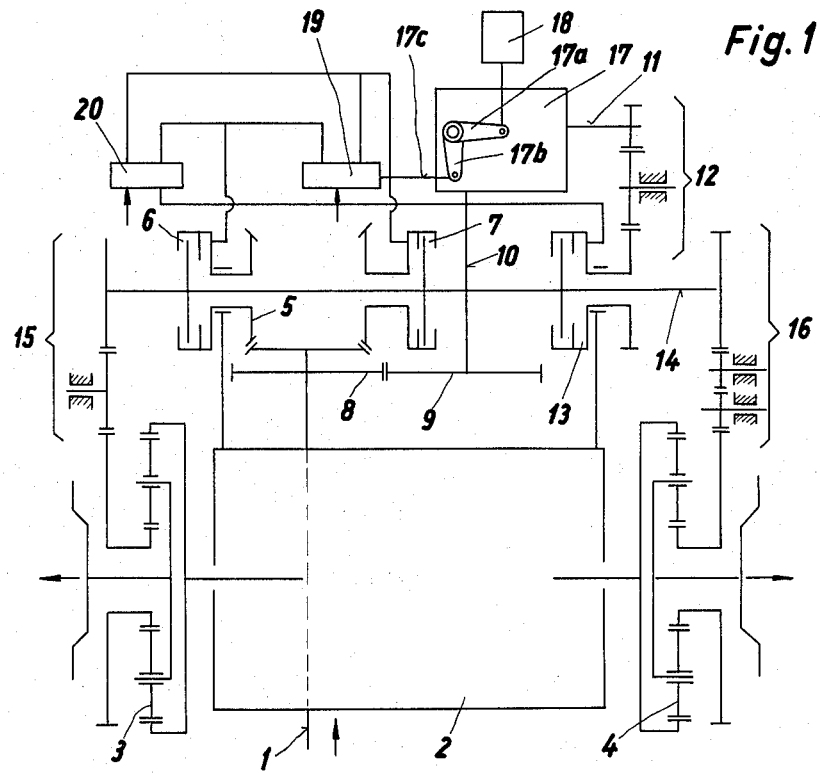
FIG. 1 shows one form of the invention wherein a hydrostatic power steering can be applied to the steering shaft via a single clutch, combined with mechanical steering power.

In the modification of FIG. 1, the hydrostatic drive 17 has an output shaft 11 in driving connection with the steering shaft 14 via an intermediate gear 12, and a fluid-operated clutch 13. The clutch 13 receives pressure oil via the control valve 20 (FIG. 1a), as long as the adjusting lever 17a for the hydrostatic gear 17 is not in either of the end positions for the two directions of swing. However, whenever the adjusting lever 17a reaches either one or the other end position, depending on the direction of operation, a valve 19 actuates valve 20 via pressure when valve 19 has been moved far enough by means of the lever 17b acting through rod 17c. Depending on the direction of operation of rod 17c, either clutch 6 or 7 will then receive pressure oil and will be engaged. The steering is thus shifted from the hydrostatic drive to mechanical drive, and clutch 13 is disengaged by the action of valve 20 at the time either clutch 6 or 7 receives engaging pressure with some overlap of pressure release of clutch 13 as pressure is applied to clutch 6 or 7, so that interruption of steering power is avoided.

Figure 1A:
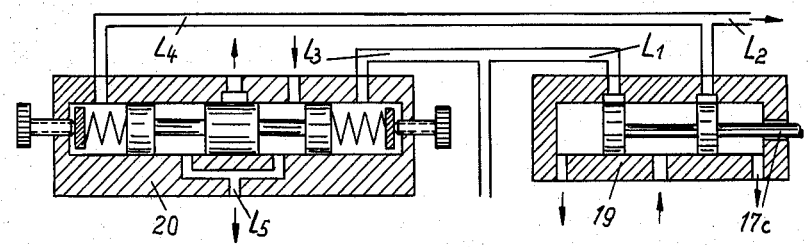
FIG. 1a shows a cross section of one form of valving which may be used in the system of FIG. 1.

Thus, referring particularly to FIG. 1a, the flow in oil lines $L_1$ and $L_2$ is controlled by valve 19, and the lines lead to the clutches 6 and 7. Branches of $L_1$ and $L_2$, $L_3$ and $L_4$, lead to valve 20, as shown. Accordingly, whenever clutch 6 or 7 is engaged, oil pressure will also reach valve 20 via either $L_3$ or $L_4$, and the valve 20 will this interrupt the flow of pressure oil to the clutch 13 via the line $L_5$. Simultaneously, the valve 20 will connect the line $L_5$ with exhaust. The valve 20 is normally held in a central position by two springs, as shown, whose tension can be adjusted by means of adjusting screws, as shown. In this manner, the pressure at which the valve 20 will open clutch 13 can be predetermined. This pressure is always regulated in such a manner that the valve 20 will first disengage clutch 13, whenever either the clutches 6 or 7 has been wholly or partially closed, in order not to interrupt the drive of the control shaft 14.

The control means 18 is for control of the pump in the pump-motor device 17 and is under operator control for effecting pump fluid supply control to regulate rate of turning and direction of turning, or just direction of turning. Thus, shaft 11 is reversibly rotatable to drive clutch 13 whence shaft 14 is reversibly rotatable to effect steering direction.

Therefore, steering is generally effected by hydrostatic power for most of the pivotal range of lever 17a, but mechanical power takes over at either end of the travel of such lever, the arrangement being such that oil pressure of the pump is reduced to zero at the center of travel of the lever 17a so that clutch 13 is not driven by shaft 11 in straight ahead steering.

Control means 18 may be any conventional system operated by oil pressure, solenoids, etc., under push-button or hand-lever control and persons skilled in the art will know how to design and construct such devices. The pump-motor combination is of conventional construction which permits speed and direction control, e.g., a radial piston-type or sliding vane-type, all of well known construction, likewise a axial piston type.

In the form of the invention shown in FIG. 2, a pair of individual one-way clutches 21a and 21b are utilized as part of a composite clutch 21 in place of the clutch 13 of FIG. 1. Each clutch is rotative in a respective direction and can be selectively brought into torque transmitting engagement with a gear 12a. Part of the gear system 12 which brings steering power from shaft 11 of the hydrostatic pump-motor combination 17.

Gear 12a has a hub 31 which is fixed on a sleeve 30 between the hubs of two support members 42, 43 for the inner races 42a, 43a of the one-way clutches 21a and 21b. The sleeve 30 is rotatably disposed on steering shaft 14 between two support member 44, 45 for the outer races 44a and 45a of the one-way clutches 21a and 21b. The two support members 44, 45 are drivingly mounted to steering shaft 14.

In both ends of hub 31 holes 31a and 31b are arranged parallel to the axis of steering shaft 14. In these holes 31a and 31b the locking bolts 32 and 33 are disposed. The ports 31c and 31d are connected by means of the oil pressure lines 38 and 39 with the valve 22 which valve is controlled at operator control device 18 through the levers 17a and 17b, as hereinabove explained, and via pull rod 17c and valve 19 for the purpose of selective pressure feed to the bores and to the clutches 6 and 7.

FIGS. 2b and 2c show partial cross-sections of the clutches 21a and 21b, illustrating some of the gripping rollers 46, it being understood there is a plurality of such rollers in each clutch as well as an adjustable roller locking element such as a bar 47a resp. 48a for each roller, such bars forming the roller cage, the other bars not being shown. The bars 48a will hold their respective rollers in disengaging condition, as shown in FIG. 2c, or permit an engaging condition, as shown in FIG. 2b. The arrangement prevents closure of clutch 21b when clutch 21a is operative, and vice versa. This is important when changing from hydrostatic to mechanical steering. For example, assuming that clutch 21a is driving shaft 14 and the operator moves the control for steering in a smaller arc, the mechanical steering components then come into play. This will result in driving the clutch race 42a at a higher rotational speed, overrunning the race 44a. Accordingly, if clutch 21b were not prevented by means of the bars 48a from effecting engagement, the clutch would close.

The bars 47a and 48a are arranged on discs 47 and 48, which are rotatably disposed on hubs of support members 42 and 43 by hubs 34 and 35. Each of hubs 34 and 35 has a recess 34a resp. 35a with a limit face 34b resp. 35b, parallel disposed to the axis of hubs.

The other limit faces 34c and 35c of the recesses 34a and 35a have a angle of inclination to the axis. The locking bolts 32 and 33 have conical faces 32a and 33a with the same angle of inclination.

The closure of the one-way clutches is dependent on the direction of rotation of shaft 11 driven by the hydrostatic mechanism 17 wherein control is afforded via valve 22.

FIG. 2f shows a section of valve 22 and valve 19. Corresponding to FIG. 1a, the flow in oil lines $L_{11}$ and $L_{12}$ is also controlled by valve 19, and the lines $L_{13}$ and $L_{14}$ are connecting valve 19 with valve 22, as shown. In like manner as valve 20 in FIG. 1a, the valve 22 is normally held in central position by two springs, whose tension can be adjusted by means of adjusting screws. Moving piston of valve 19 to right by rod 17c, pressure oil flows to valve 22 via line $L_{12}$ and to hole 31b via line 39 and port 31d. By means of oil pressure tends to move the locking bolt 33 in locking position.

When the piston of valve 19 is moved far enough to the right, the oil pressure applied to the land face 22a moves the piston of valve 22 to the right connecting line $L_{12}$ with line $L_{14}$ to clutch 7, and a certain oil pressure in line 39 is reached, which moves bolt 33 in locking position, as shown in FIGS. 2c and 2e. It will be understood that the roller cages are rotated in opposite directions to perform the roller blocking or unblocking functions so that one clutch is prevented from engagement while the other clutch is permitted to engage, and vice-versa.

In the form of the invention shown in FIG. 3, the arrangement is generally similar to that explained for FIGS. 1 and 2, although of somewhat simpler and more economical construction. Thus, in FIG. 3, the arrangement provides for by-passing some of the pressure fluid operative in the pump-motor combination 17 and no additional clutch is needed between the shaft 11 and the steering shaft 14. Thus, when shaft 14 is powered mechanically via clutch 6 or 7, it rotates faster than it would, if powered from shaft 11. This causes the motor of the pump-motor combination to rotate faster than the pump. Accordingly, it is necessary that the motor outlet be connected with the oil input of the pump. This by-passes a certain portion of oil by way of causing circulation between the pump and motor, while, at the same time, cutting off the supply of oil to the pump from the oil sump or reservoir. To effect this circulation, as well as for cutting off oil supply to the pump, a valve 24 of multi-port type, heretofore described such as valve 20, is disposed in the system and connected to the clutch for actuation by valve 19, which latter valve controls inlet and outlet flow of the clutches 6 and 7, as hereinabove described, while, at the same time, effecting connections for oil circulation between the pump and motor when either the clutch 6 or 7 is engaged. However, when neither clutch 6 or 7 is engaged, then valve 24 reconnects the oil sump to the pump and cuts off circulation of oil between the pump and motor and hydrostatic steering is then effected.

Figure 3A:
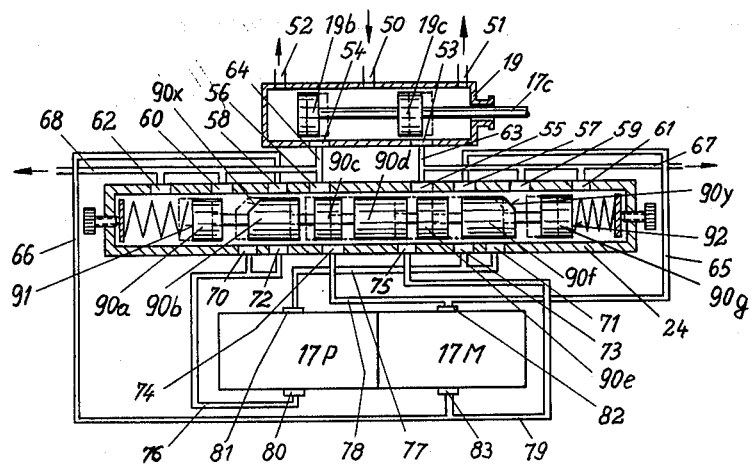

FIG. 3a shows valves 19 and 24, when shaft 14 is powered by pump-motor combination 17. Valve 19 has port 50 for pressure inlet, ports 51, 52 for connection with oil sump, and ports 53, 54 for connecting valve 19 with valve 24 and clutches 6 and 7. Valve 24 has ports 55, 56 for oil lines 63, 64 to valve 19, ports 57, 58 for connection with lines 65, 66 to the motor of pump-motor combination 17. The ports 59, 60, 61, 62 of valve 24 are connected with oil lines 67, 68 to clutches 6 and 7. All said ports of valve 24 can be disposed in a same plane.

The following ports of valve 24 can also be disposed in a same plane but not in the plane of ports 55, 56, 57, 58, 59, 60, 61 and 62.

The port 80 of pump 17P of pump-motor combination 17 is connected with the ports 70 and 72 of valve 24 by line 76. The line 77 connects the port 81 of pump 17P with the ports 71 and 73 of valve 24. The port 82 of motor 17M of pump-motor combination 17 is connected with port 74 of valve 24 by line 78, and besides with port 57 by line 65. The port 83 of motor 17M is connected with port 75 of valve 24 by line 79 and with port 58 of valve 24 by line 66.

In valve 19 the piston 19a with the lands 19b and 19c is disposed. The piston 19a will shift through the rod 17c. In the neutral position the lands 19b and 19c block the ports 53 and 54 of valve 19 (FIG. 3a showing this position in broken lines).

The valve 24 comprises the piston 90, which is provided with lands 90a, 90b, 90c, 90d, 90f and 90g. In FIG. 3a the neutral position of this piston is designed in broken lines.

In FIG. 3a, the positions of valves 19 and 90, designed in full lines, are marking the arrangement when the control valving is set for hydrostatic power directly coupled to the steering shaft 14. The valve 19 is shifted to the left, whereby the inlet 50 and line 64 will connect by means of the groove between land 19b and 19c. The line 63 will connect with port 51. The oil pressure is supplied through the line 68 on face 91 of land 90a. The piston 90 will shift to the right in the designed position opening the ports 70, 73, 57, 75 and 55. The line pressure in the line 68 is also acting on clutch 7 but not engaging. The pressure oil flows through port 60 in valve 24 and through port 70 and line 76 to port 80 of pump 17P. Out of the pump 17P flows the oil from port 81 through line 77 and port 73 to valve 24. The groove between lands 90e and 90f connects port 73 with port 57, which is connected with port 82 of motor 17M by means of line 65. Through port 83, line 79 and port 75 the oil flows back to valve 24. The groove between the lands 90d and 90e connects port 75 with port 55, which is connected with line 63 to port 53, and the port 53 is connected with outlet 51 to the oil sump.

Figure 3B:
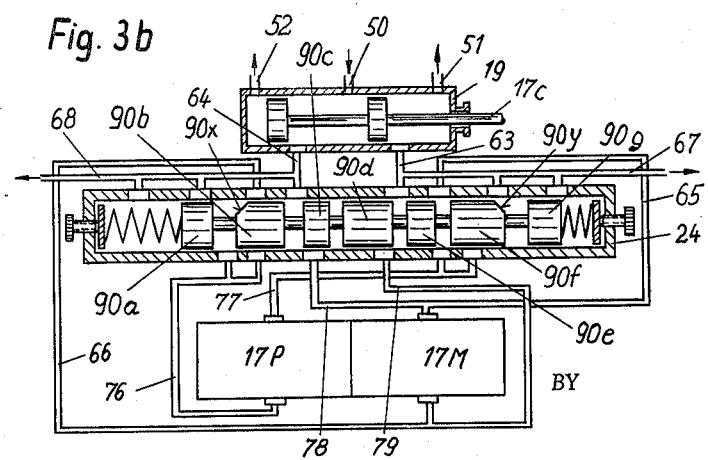

With becoming greater shiftway of valve 19 the line pressure increases and tends to move the piston 90 to the right, till land 90a blocks the port 60. Now increases also the oil pressure on clutch 7, which will be engaged. The position of valves 19 and 24 shows FIG. 3b, in which the supply of oil to the pump 17P is cut off by land 90a. In the shift position of valve 24, shown in FIG. 3b, the motor outlet is port 83 which is connected with the port 58 of valve 24 by line 66.

Since on land 90b a bevelment 90x is provided port 58 is connected with port 70 by space between lands 90a and 90b. The port 70 is connected with inlet 80 of pump 17P by line 76. Accordingly, by-passing for a certain portion of oil is effected.

For effecting opposite turning radii, valve 19 will be moved in opposite direction by rod 17c, and pressure oil from inlet 50 flows through port 53, line 63, line 67 and port 61 to valve 24. Oil pressure, acting on face 92 of land 90g, moves valve piston 90 to the left. In this position inlet and outlet for pump 17P and motor 17M are changed. Accordingly, the pump-motor-combination drives in opposite direction. When clutch 6 is engaged by-passing for pump-motor combination is effected by bevelment 90y.

Having thus described the invention it is understood that changes may be made within the spirit thereof and, accordingly, it is not desired to limit the invention to the precise illustrations herein given except as set forth in the appended claims.

What is claimed is:

1. A system for combining mechanical and hydrostatic steering in a tracked vehicle comprising a steering shaft and a speed range transmission gear box, a drive for each side of the vehicle and said drives being connected to said gear box for variable speeds, said steering shaft being connected to said drives, and means for selectively rotating said steering shaft in either direction to effect selected steering direction at a steering radius dependent upon the speed selected, a hydrostatically operated power shaft and means for connecting said shaft to said steering shaft for hydrostatic power operation thereof and control means for switching to either mechanical or hydrostatic steering.

2. A system as set forth in claim 1, said control means comprising an operator controlled member movable bi-directionally between either of two limiting positions wherein intermediate positions effect steering radii control of hydrostatic steering and wherein, as said member approaches either limiting position, mechanical steering is effected, steering direction being dependent upon the direction of operator controlled movement of said member and the limiting position of said member effects cessation of hydrostatic steering with predetermined overlap of hydrostatic steering power with mechanical steering power.

3. In a system as set forth in claim 1, said control means further comprising a pair of pressure operated clutches on said steering shaft having members engine driven in opposite directions, and valve means for effecting selective engagement of said clutches depending upon selective directional actuation of said control means by an operator for effecting directon of steering, and a third clutch on said shaft controlled by said valve means and being driven by said hydrostatic drive means and operative to effect rotation of said steering shaft in a selective direction dependent upon selective control of said hydrostatic drive means by said control means.

4. A system for combining mechanical and hydrostatic steering in a tracked vehicle comprising a steering shaft and a speed range transmission gear box, a drive for each side of the vehicle and said drives being connected to said gear box for variable speeds, said steering shaft being connected to said drives and means for selectively rotating said steering shaft in either direction to effect selected steering direction at a steering radius dependent upon the speed selected, a hydrostatically operated power shaft and means for connecting said shaft to said steering shaft for hydrostatic power operation thereof comprising a pair of one-way clutches operatively engageable in opposite direction of rotation and control means for switching to either mechanical or hydrostatic steering and for rendering either of said one-way clutches operational by controlling direction of rotation of said hydrostatically operated power shaft.

5. In a system as set forth in claim 1, said control means comprising a member movable between either of two limiting positions wherein intermediate positions effect control of hydrostatic steering and wherein as said member approaches either limiting position, mechanical steering is effected in a direction dependent upon the limiting position which said member approaches and hydrostatic steering ceases, and a hydrostatic pump-motor device for powering said hydrostatically operated power shaft wherein pressure fluid is by-passed from the motor outlet to the pump inlet when mechanical steering is effected.

6. In a system as set forth in claim 1, said control means comprising a pair of pressure operated clutches on said steering shaft having members driven in opposite directions and comprising valve means for effecting selective engagement of said clutches depending upon selective actuation of said control means for effecting selective mechanical steering by either clutch dependent upon direction of steering desired, and a third pressure operated clutch on said shaft controlled by said valve means and being connected to said hydrostatic drive means and operative to effect rotation of said steering shaft in a selective direction dependent upon selective control of said hydrostatic drive means, said control means further comprising an operator control member having bi-directional motion and said valve means comprising a pair of multi-way valves, one valve being di-directionally actuated by said control member to determine steering direction, and the other valve being actuated bi-directionally in response to actuation of said one valve, said one valve being connected to effect selective control of said first two clutches depending on actuation direction and said other valve being connected to control said third clutch for engagement in either direction of actuation, and means for effecting adjustment of said other valve to provide predetermined clutch drive overlap of said steering shaft between disengagement of said third clutch and engagement of either of said first two clutches wherein said third clutch is initially engaged prior to engagement of either of said pair of clutches.

References Cited by the Examiner
UNITED STATES PATENTS 2,352,483  6/1944  Jandesek _____ 180—6.44

DAVID J. WILLIAMOWSKY, *Primary Examiner.*

JOHN R. BENEFIEL, *Examiner.*